US012336532B2

(12) United States Patent
De Brito Estrela et al.

(10) Patent No.: US 12,336,532 B2
(45) Date of Patent: Jun. 24, 2025

(54) INSULATOR FOR PREVENTING CONTAINER DAMAGE AND RUPTURE CAUSED BY FREEZING OF AQUEOUS SOLUTIONS CONTAINING BIOLOGICAL MATERIALS

(71) Applicant: SMARTFREEZ, LDA, Porto Salvo (PT)

(72) Inventors: Rui De Brito Estrela, Lisbon (PT); Andreia Filipa Silvestre Duarte, Sacavém (PT); Pedro Gil Sena Rego, Lisbon (PT)

(73) Assignee: SMARTFREEZ, LDA, Porto Salvo (PT)

( * ) Notice: Subject to any disclaimer, the term of this patent is extended or adjusted under 35 U.S.C. 154(b) by 236 days.

(21) Appl. No.: 17/292,921

(22) PCT Filed: Nov. 12, 2019

(86) PCT No.: PCT/IB2019/059704
§ 371 (c)(1),
(2) Date: May 11, 2021

(87) PCT Pub. No.: WO2020/100028
PCT Pub. Date: May 22, 2020

(65) Prior Publication Data
US 2022/0000097 A1  Jan. 6, 2022

(30) Foreign Application Priority Data
Nov. 12, 2018  (PT) .......................................... 115152

(51) Int. Cl.
*A61J 1/16*     (2023.01)
*A01N 1/146*   (2025.01)

(52) U.S. Cl.
CPC ............... *A01N 1/146* (2025.01); *A61J 1/165* (2013.01)

(58) Field of Classification Search
CPC ....................................................... A61J 1/165
See application file for complete search history.

(56) References Cited

U.S. PATENT DOCUMENTS 4,377,077 A * 3/1983 Granlund ................. F25D 9/00
                                                       435/307.1
6,209,343 B1   4/2001 Owen
(Continued)

FOREIGN PATENT DOCUMENTS

EP    0718212 A1   6/1996
EP    1302410 A1   4/2003
(Continued)

*Primary Examiner* — Jonathan M Hurst
(74) *Attorney, Agent, or Firm* — Leason Ellis LLP

(57) ABSTRACT

This disclosure relates to a system for freezing, transporting, storing and thawing aqueous solutions of biological materials, in particular those used in chemical and pharmaceutical processes. In particular, this disclosure relates to ice-crust attenuator devices to prevent ice-crust formation at the top of the solution. The ice-crust attenuator devices (10) have an internal cavity comprising a phase change material to improve thermal insulation. The ice-crust attenuator device may comprise an internal wall made of a moldable material configured to attain a good thermal contact between the ice-crust attenuator device and the outer surface of the container. In another embodiment, the ice-crust attenuator device is configured to be placed in a refrigerated cavity and in contact with the upper surface of a moldable container, to keep the top of the container under insulated conditions. The ice-crust attenuator device may be connected to a holder to accommodate the moldable container.

10 Claims, 10 Drawing Sheets

(56) References Cited

U.S. PATENT DOCUMENTS

| | | |
|---|---|---|
| 7,104,074 B2 | 9/2006 | Voute et al. |
| 9,301,520 B2 | 4/2016 | Cutting et al. |
| 10,897,892 B1* | 1/2021 | Sole .................... A01N 1/0268 |
| 2003/0072687 A1 | 4/2003 | Nehring et al. |
| 2012/0210734 A1 | 8/2012 | Hoffman |
| 2012/0325826 A1* | 12/2012 | McCormick .............. F25D 3/06 |
| | | 220/592.01 |
| 2014/0150464 A1* | 6/2014 | Bloedow ................ F25B 21/04 |
| | | 62/457.2 |
| 2017/0135337 A1 | 5/2017 | Brown et al. |

FOREIGN PATENT DOCUMENTS

| | | |
|---|---|---|
| EP | 2772451 A1 | 9/2014 |
| WO | WO 2012088311 A2 | 6/2012 |
| WO | WO 2014079927 A1 | 5/2014 |
| WO | WO 2017220954 A1 | 12/2017 |
| WO | WO 2018129576 A1 | 7/2018 |
| WO | WO 2018211437 A1 | 11/2018 |

* cited by examiner

INSULATOR FOR PREVENTING CONTAINER DAMAGE AND RUPTURE CAUSED BY FREEZING OF AQUEOUS SOLUTIONS CONTAINING BIOLOGICAL MATERIALS

CROSS-REFERENCE TO RELATED APPLICATIONS

This application is a U.S. National Stage Application under 35 U.S.C. § 371 of International Patent Application No. PCT/IB2019/059704, filed Nov. 12, 2019, which claims priority to Portugal Patent Application No. 115152, filed Nov. 12, 2018, the contents of which are each hereby incorporated by reference in their respective entireties.

TECHNICAL FIELD

The present disclosure relates to systems for freezing, transporting, storing and thawing aqueous solutions of biological materials, in particularly those used in chemical, and pharmaceutical processes. In particular, this disclosure relates to insulators to prevent uncontrolled freezing and container damage or rupture.

BACKGROUND

Biological materials are produced industrially in large batches that are stored for later use as needed, providing this way great management flexibility. In many cases, the biological materials are obtained as aqueous solutions, which are stored frozen with two main objectives: increase the shelf-life of the product and facilitate its transport. Usually, the produced batches are split in smaller amounts and place inside bottles, carboys and bags for storing, transporting, freezing and thawing. However, freezing, handling and transportation of containers at low temperature presents several risks, such as the degradation of the biological material and/or container rupture.

Currently, the freezing of biological materials involves placing a container (bottles and/or carboys) comprising the biological materials in a cabinet or chest freezer and allowing the biological materials to freeze. In other techniques, a moldable container (bags) enclosing biological materials is placed on a solid or wire-frame shelf in the cabinet or chest freezer. However, problems exist in such freezing techniques as currently configured.

At low temperatures, the physical properties of the plastics materials of the containers may change, leading to their fragility and consequently can reduce the containers' ability to absorb external forces, i.e., shocks without fracturing. Also, the volumetric expansion of the ice inside the containers can cause significant mechanical stress, leading to a container, tubing or connector break. Moreover, the heat transfer in the top of the containers, both by convection and radiation, can also lead to the formation of an ice-crust, consisting on an ice layer at the top of the liquid, at the air interface, in the head-space region of the containers, contributing to the cryoconcentration and increasing pressure in the containers and consequently resulting in their damage or rupture.

Rupture or damage to the integrity of the containers is undesirable, as it can compromise sterility or lead to contamination or leakage or loss of the biological material. The storing and transportation processes also present some hazard risks since one is dealing with fragile containers that were previously submitted to the freezing process, which can damage or induce mechanical failure. While it is well known that the containers and freezing technologies currently available do not adequately protect the frozen products, the pharmaceutical industry has not been adequately documented the incidence of containers damage during the freezing process.

Systems and methods for freezing, storage and transport of moldable containers containing biological materials, has been already disclosed in order to protect such containers from damage or mechanical failure. For example, the document U.S. Pat. No. 7,104,074B2 disclosed a system for freezing, thawing, transporting, and storing biopharmaceutical materials, which includes a container, a supporting structure, a temperature control unit, and a transportation cart. The supporting structure is configured to support a container of biopharmaceutical material and the transportation cart includes channels configured to receive supporting structures, such as frames. The frame is configured to receive and support bags in the vertical position. Also, the document U.S. Pat. No. 9,301,520B2 disclosed a system for cooling, freezing, preserving, processing and thawing biopharmaceutical materials. This system includes a moldable container configured to contain the biopharmaceutical materials and to be supported by a supporting and/or protective structure, such as a holder. The holder may have a pillow-shape and acts as a protector, supporting structure or frame for supporting a moldable container during filling, transport, storage, and/or freezing of biopharmaceutical materials. The document WO2018129576A1 also relates to a housing for a moldable container for transporting liquids, which is at least partially coated with an elastic foam.

Although there are already systems and methods that protect the moldable containers, mainly bags, during the freezing, transport, storage and thawing processes, these systems do not avoid the problem of heat transfer on the top of the containers that leads to the formation of an ice-crust, which leads to cryoconcentration and increased pressure in the containers, resulting in their damage or rupture. Moreover, a system capable of avoiding such problems in rigid containers, such as bottles and/or carboys comprising biological materials, does not yet exist. The present disclosure aims at solving the above-mentioned problems.

GENERAL DESCRIPTION

This disclosure discloses a device for freezing or thawing an aqueous biological solution, shaped to fit the top of a container, comprising:
  an external wall and an internal wall comprising a thermal insulating material;
  an internal cavity comprising a phase change material;
  wherein the cavity is between the internal and the external wall;
  a recess configured for receiving a container;
  wherein the freezing temperature of the phase change material is substantially close to the freezing point of the aqueous biological solution, preferably ranging from a freezing temperature close to the one of the biological solution to 10% above of the freezing point of the biological solution, reducing and/or preventing ice-crust formation on the solution surface.

In a further embodiment, the invention discloses a device, wherein the internal and external walls are continuous, thus forming a single unit.

In a further embodiment, the invention discloses a device, wherein the phase change material is a pure liquid or liquid mixture, preferentially with a freezing temperature between −5° C. and 5° C., more preferentially between −5° C. and 0° C.

In a further embodiment, the invention discloses a device, wherein the internal wall further comprises a moldable thermal insulating material.

In a further embodiment, the invention discloses a device, wherein the thermal insulating material of the internal wall is moldable to form an air-tight seal over the container opening.

In a further embodiment, the invention discloses a device, wherein the thermal insulating material of the internal and external walls are different.

In a further embodiment, the invention discloses a device, wherein the thermal insulating material of the internal and external walls comprises a low thermal conductivity material.

In a further embodiment, the invention discloses a device, wherein the thermal insulating material of the internal and external walls comprises a thermal conductivity of less than $0.5 \text{ W m}^{-1} \text{ K}^{-1}$.

In a further embodiment, the invention discloses a device, wherein the thermal insulating material of the internal and external walls are plastic or polymer, such as poly-ethylene, polypropylene, polycarbonate, polylactic acid, or combinations thereof.

In a further embodiment, the invention discloses a device, wherein the volume of phase change material in the internal cavity is not more than 50% of the volume of the aqueous biological solution.

In a further embodiment, the invention discloses a device, wherein the volume of phase change material in the internal cavity is not more than 20% of the volume of the aqueous biological solution.

In a further embodiment, the invention discloses a device, wherein the phase change material is water, a mixture of water and ethylene glycol, a mixture of water and sodium chloride, a mixture of water and ethanol, combinations thereof, among others solutions.

In a further embodiment, the invention discloses a device, wherein the phase change material further comprises a nucleating agent, such as fine particles of silver iodide, lead iodide, or combinations thereof.

In a further embodiment, the invention discloses a device, wherein the moldable material is a resilient or a soft material, preferably extruded polystyrene foam, polyurethane foam, polychloroprene or acrylonitrile butadiene rubber, or combinations thereof.

In a further embodiment, the invention discloses a device, wherein the device is configured to cover the top of a container, preferably 20% of the height aqueous biological solution.

In a further embodiment, the invention discloses a device, wherein the device is configured to cover the top of a bottle, a vial, a tube, a bag or similar.

In another embodiment the invention discloses a kit comprising:

the ice-crust attenuator device of the invention configured to be placed in the cavity of a chamber, in the top of a moldable container, preferentially in contact with its upper surface.

and a holder to accommodate a moldable container.

In a further embodiment, the invention discloses a kit, wherein the holder is made of a plastic, polymer or other material having low thermal conductivity.

In a further embodiment, the invention discloses a kit, wherein the holder comprises one or more surfaces made of a metal, alloy or a high thermal conductivity polymer, preferentially made of a material with a thermal conductivity higher than $0.5 \text{ W m}^{-1} \text{ K}^{-1}$.

In a further embodiment, the invention discloses a device wherein the recess is vertical configured to receive the aqueous biological solution is in a small-volume flexible container.

BRIEF DESCRIPTION OF THE DRAWINGS

These and other objects, features and advantages of the disclosure will be evident from the following detailed description when read in conjunction with the accompanying drawings.

DETAILED DESCRIPTION

In this section, the fundamentals of the operation of the object of disclosure and of proposed embodiments will be described.

As presented above, many variables contribute to the rupture or damage of the containers during the freezing process, which can result in the degradation or loss of the biological material. The present disclosure describes devices for freezing, transporting, storing and thawing aqueous solutions of biological materials aiming to solve the above-mentioned problems.

Figures 1A, 1B:
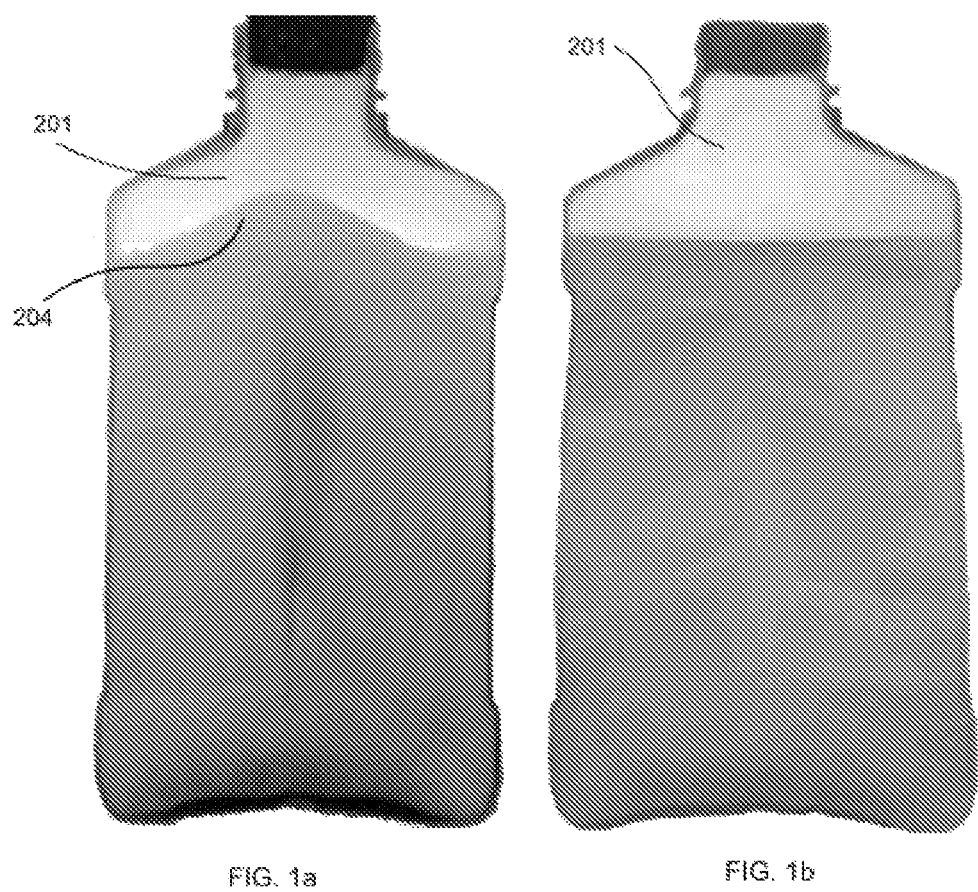
FIG. 1a is a cross-section view of a container of fixed shape 20 frozen without the ice-crust attenuator device 10 in accordance with present disclosure.
FIG. 1b is a cross-section view of a container of fixed shape 20 frozen with the ice-crust attenuator device 10 in accordance with present disclosure.
Figure 2:
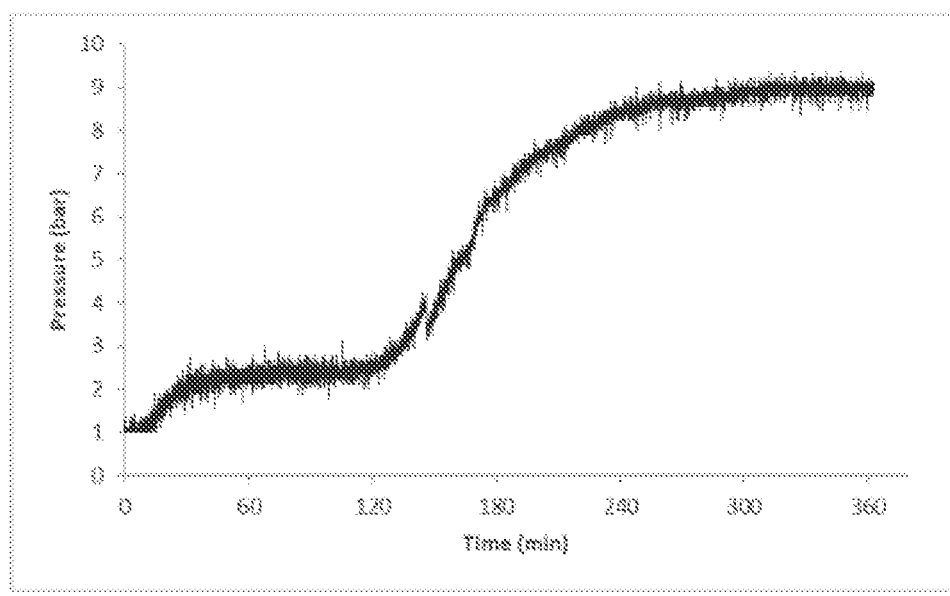
FIG. 2 shows the increasing pressure inside the bottle during the freezing process without the ice-crust attenuator device 10 in accordance with present disclosure.

It was observed that one of the main problems in the freezing process is the formation of an ice-crust at the top of the liquid, at the air interface, in the head-space region of the containers, due to the heat transfer, by convection and radiation, in the top of the containers (FIG. 1a). The ice-crust is defined as the thick layer of ice formed on the surface of the liquid and air interface, usually characterized by a "pyramidal" shape (FIG. 1a). This ice-crust leads to the increasing pressure in the containers, as shown in FIG. 2, and consequently resulting in their damage or rupture and loss of the biological material.

We herein disclose that in order to freeze aqueous solutions of biological materials in a container avoiding such problems, it is necessary to have an insulator in the top of the container with heat resistance or with controlled heating to maintain the top part of the container under insulated conditions, avoiding the formation of a top ice-crust, as shown in FIG. 1b.

Therefore, the present disclosure discloses systems that allow the improvement of the freezing process of aqueous solutions of biological materials avoiding the ice-crust formation and the issue of increasing pressure inside the containers, while preventing cryoconcentration and the damage or rupture of the containers.

Figure 3:
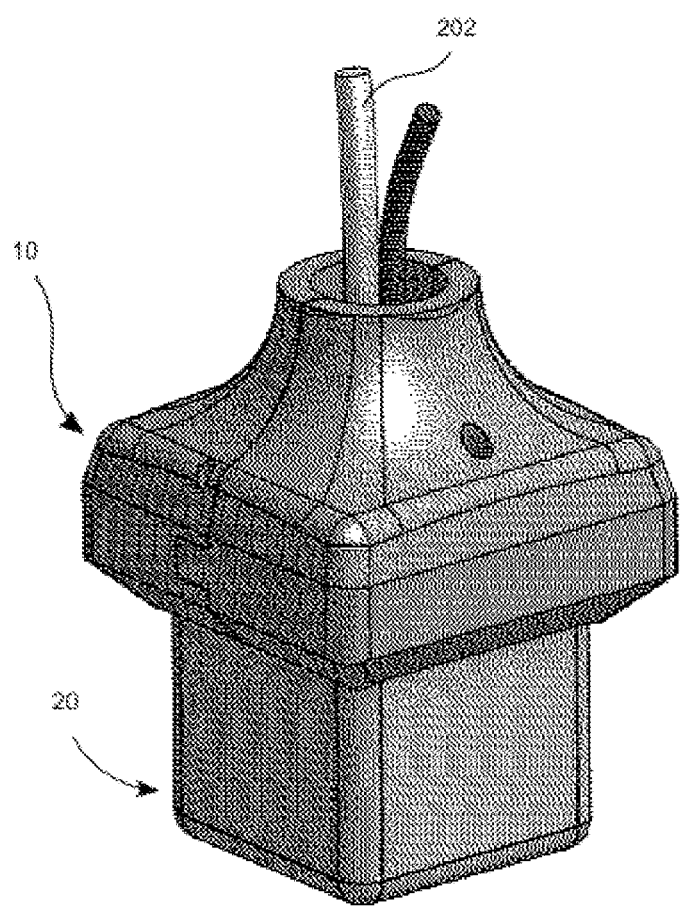
FIG. 3 is an elevated view of a container of fixed shape 20 and an ice-crust attenuator device 10 in accordance with present disclosure.
Figure 4:
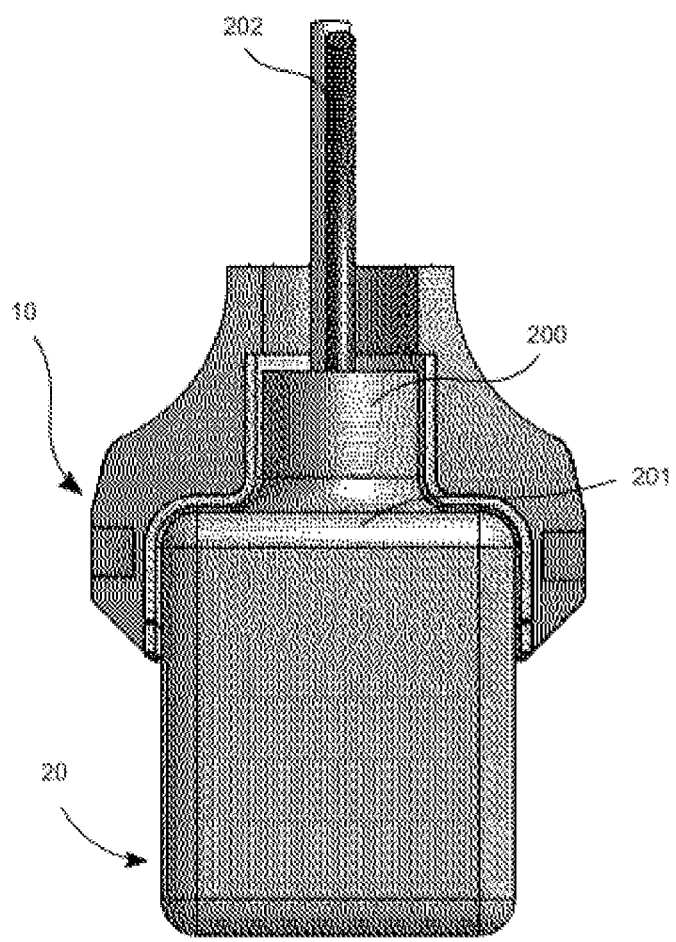
FIG. 4 is a lateral view of a container of fixed shape 20 and an ice-crust attenuator device 10 in accordance with present disclosure.

In an exemplary embodiment depicted in FIG. 3 and FIG. 4, an ice-crust attenuator device 10 installed on a container of fixed shape 20 for freezing, transporting, storing and thawing aqueous solutions of biological materials is shown. The system includes the ice-crust attenuator device 10 configured to attach to the head-space 201 of a container of fixed shape 20 containing aqueous solutions of biological materials.

Biological materials may comprise protein, amino acid and peptide formulations, DNA, RNA and nucleic acid solutions, cell suspensions, tissue suspensions, cell aggregates suspensions, cell growth media, serum, biologicals, blood products, preservation solutions, fermentation broths, and cell culture fluids with and without cells, mixtures of the above and their fragments.

In the present disclosure the container of fixed shape 20 configured to contain aqueous solutions of biological materials can take several shapes and structural characteristics, such as bottles or carboys. Such container of fixed shape 20 should maintain its shape when empty and do not significantly deform when filled with product. Said container of fixed shape 20 can be made of a rigid and biocompatible material to promote compatibility with biological materials. The rigid materials can be, for instance, glass, polyethylene terephthalates, polycarbonate, polytetrafluoroethylene, polyethylene, polyesters, polyamides, polypropylenes, ethylene-vinyl alcohol copolymer, polyvinylidenefluoride, polyvinylchlorides, and copolymers, mixtures or laminates that comprise the above. Said container of fixed shape 20 may vary in size and volumetric capacity. In a preferred embodiment, container of fixed shape 20 has a volumetric capacity in a range from approximately 10 mL to approximately 20 L, preferably in a range from approximately 2 L to approximately 20 L and more preferably in a range from approximately 2 L to approximately 10 L. Said container of fixed shape 20 configured to contain aqueous solutions of biological materials can comprise a head-space region 201 and one cap 200. Said cap 200 may take several forms, with at least one port with tubing 202 for aseptic filling and venting operations.

Figure 5:
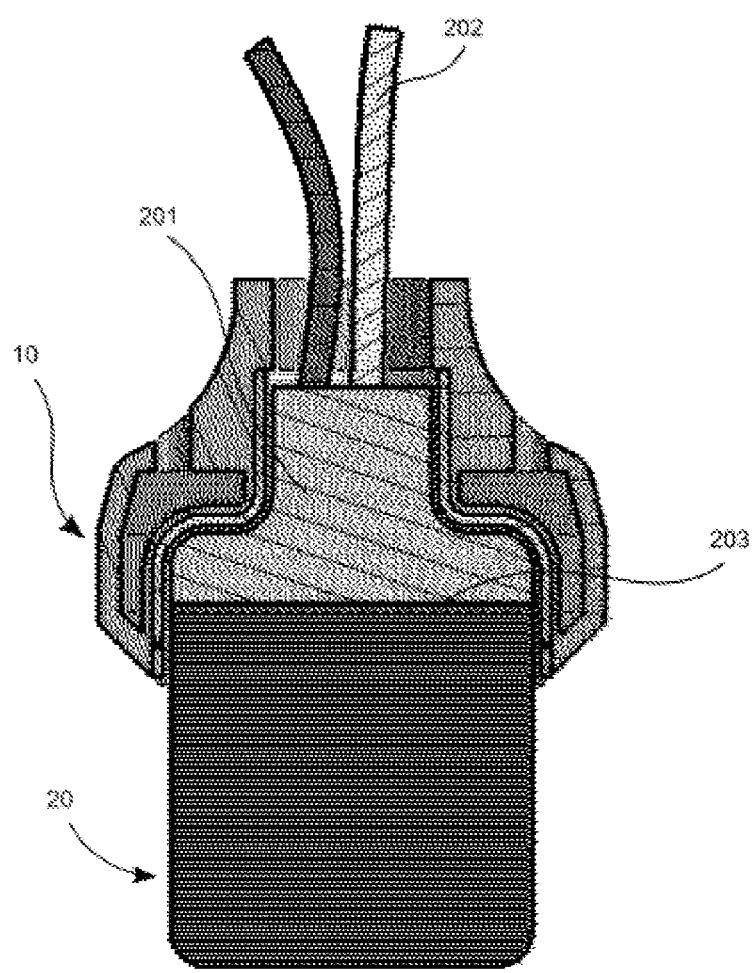
FIG. 5 is a schematic cross-section view of a container of fixed shape 20 and an ice-crust attenuator device 10 in accordance with present disclosure.

The embodiment depicted in FIG. 5 comprises an ice-crust attenuator device 10 with heat resistance or with controlled heating configured to attach to the head-space 201 of the container of fixed shape 20. The main purpose of the ice-crust attenuator device 10 is to prevent the formation of the ice-crust that leads to the increasing pressure inside the containers and consequently resulting in their damage. Thus, the ice-crust attenuator device 10 has two main functions that allow the desired effect to be achieved (do not form the ice-crust avoiding the damage of the containers): a) eliminate the loss of heat at the interface of the liquid by radiation and b) do not let the air in the head-space 201 of the container cool during the freezing period through an external insulation and a specific volume of phase change material (PCM). The ice-crust attenuator device 10 is configured to attach to the head-space 201 region of a container of fixed shape 20 with defined volumetric capacity, in order to cover the head-space 201 region and preferentially 20% of the total height of aqueous solution of biological materials.

Figure 6:
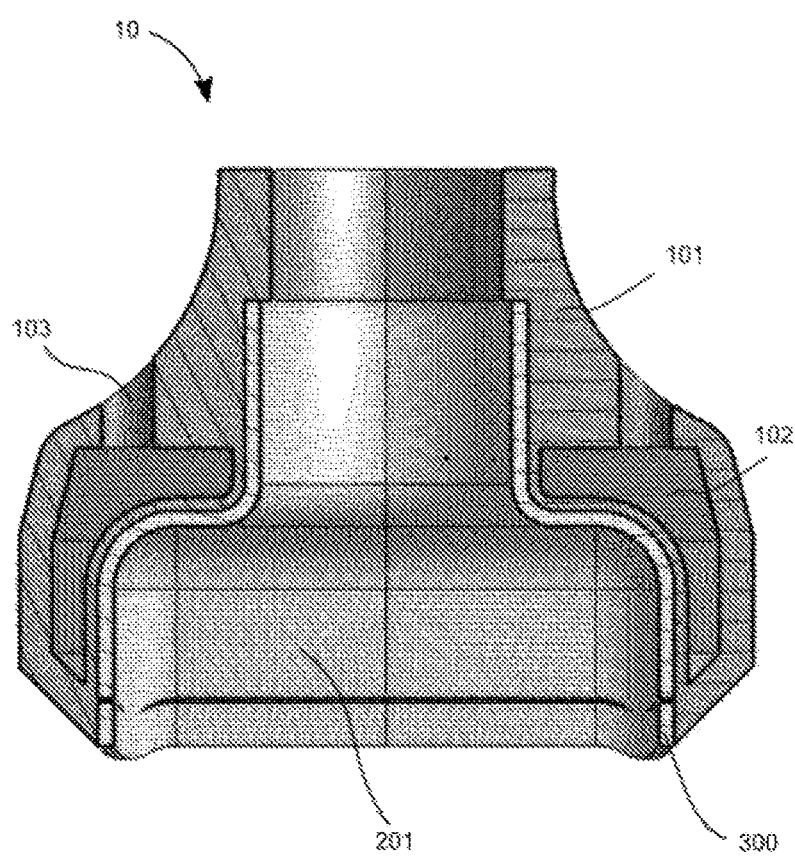
FIG. 6 is a schematic cross-section view of an ice-crust attenuator device 10 in accordance with present disclosure.

In the embodiment depicted in the FIG. 6, the ice-crust attenuator device 10 has an external wall made of an insulating material 101, such as plastic, polymer or other material having low thermal conductivity. Preferentially, the thermal insulating material 101 can be any material with a thermal conductivity less than 0.5 W m$^{-1}$ K$^{-1}$, such as poly-ethylene, polypropylene, polycarbonate, polylactic acid. To assure that the air in the head-space 201 of the container does not cool during the freezing period, the ice-crust attenuator device 10 has an internal cavity 102 arranged to be filled with a phase change material (PMC) to improve the thermal insulation.

In an embodiment, the Phase Change Material (PCM), preferably, is a pure liquid or liquid mixture with a freezing temperature identical to the one of the biological material solution, which lies typically between −5° C. and 0° C. The PCM can be, for instance, a mixture of water and ethylene glycol, a mixture of water and sodium chloride, or a mixture of water and ethanol, provided that the phase change material has the same osmolality of the aqueous solution of biological materials. Moreover, the PCM may further comprise a nucleating agent, such as fine particles of silver iodide or lead iodide, to ensure that the phase change material will not supercool during the freezing process. The internal cavity 102 can be filled with the PCM through a port 103, which is subsequently closed with a plug. The ice-crust attenuator device 10 should be configured with a determined design to assure that the quantity of PCM is not higher than 50% of the volume of the aqueous solutions of biological materials, preferentially not higher than 20% of the volume of the aqueous solutions of biological materials. The quantity of PCM can be calculated based on the PCM used, on the thickness and type of insulating material 101, on the total area to insulate, and external heat transfer coefficient. For example, the ice-crust attenuator device 10 depicted in FIG. 6 was designed to be used in a 2 L square bottle. The insulating material 101 chosen was polylactic acid (PLA) with a wall thickness of 1 cm. Therefore, to freeze an aqueous solution during 3 h, the minimal amount of PCM should be approximately 0.3 kg.

In the embodiment depicted in the FIG. 6, the ice-crust attenuator device 10 has an internal wall made of a low thermal conductivity material. Preferentially, the internal wall can be made of a moldable material 300 configured to attain a good thermal contact between the ice-crust attenuator device 10 and the outer surface of the head-space 201 of the container of fixed shape 20 to ensure that there is no air within the two surfaces. The better the thermal contact between the ice-crust attenuator device 10 and the outer surface of the head-space 201 of the container of fixed shape 20, the better the insulation. Accordingly, pressing the head-space 201 of the container of fixed shape 20 against the moldable material 300 improves the quality and repeatability of thermal contact, enhancing the thermal insulation. Said moldable material 300 may be made of any resilient or soft material, preferentially, with low thermal conductivity, such as extruded polystyrene foam, polyurethane foam, polychloroprene or acrylonitrile butadiene rubber. Said moldable material 300 may be attached to the ice-crust attenuator device 10 by means of compatible adhesive materials, by mechanical means or by magnetic contact using magnetic materials for that purpose.

Figure 7:
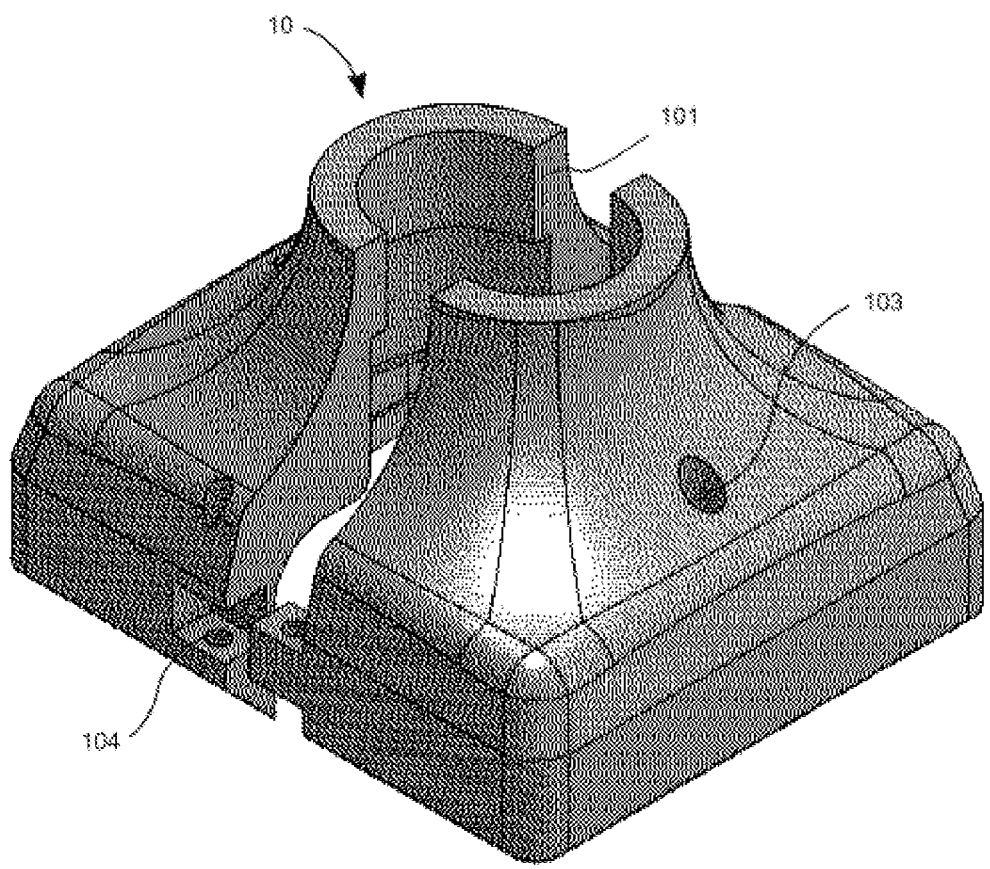
FIG. 7 is a top view of an ice-crust attenuator device 10 in accordance with present disclosure.

In another embodiment depicted in FIG. 7, the ice-crust attenuator device 10 can be split in two bodies to be easily connected and/or removed from the container of fixed shape 20. This feature associated with a suitable and effective locking system 104, can also be used to compress the ice-crust attenuator device 10 against the container of fixed shape 20. This embodiment promotes the compression to obtain satisfactory thermal contact and air tightness. Therefore, it is important that both bodies are closely connected and locked to assure the desired functions of the ice-crust attenuator device 10. The two parts of the ice-crust attenuator device are connected and locked by means of locking system 104. This locking system 104 can be standard methods, such as pins, springs, hinges, pivots, or other means to lock.

The ice-crust attenuator device 10 previously described was tested to freeze a volume of 1.8 L of a 5% (m/V) sucrose aqueous solution in a Polyethylene terephthalate (PET) bottle of 240 (h)×120 (w)×120 (d) mm of dimensions. The test was performed with and without the ice-crust attenuator device 10 described above. The bottle was frozen inside a chamber with a vertical (unidirectional) flow of gas at 3.5 m/s and −65° C., during 200 min. FIG. 1a illustrates the common freezing process without the ice-crust attenuator device 10, showing the formation of the ice-crust 204 with the typical "pyramidal" shape on the head-space 201 region of the bottle. After 45 min of freezing it was observed the formation of the ice-crust, and after 100 min the ice-crust 204 was completely formed, while in the center of the container the solution is still liquid. Moreover, the cryoconcentration in the center of the container was observed by using a dye. In turn, FIG. 1b illustrates the freezing process with the ice-crust attenuator device 10. The ice-crust attenuator device 10 herein used has an internal cavity filled with a phase change material. FIG. 1b shows that the ice-crust attenuator device 10 promotes a controlled ice front formation, avoiding the formation of the ice-crust, characterized typically by a "pyramidal" shape, as it undergoes freezing until the total freezing of the solution. Test results have demonstrated that the device described previously can avoid the formation of the ice-crust and consequently decreasing the pressure inside the container. It was also evaluated the pressure inside a 5 L PET bottle, with 322 (h)×268 (w)×168 (d) mm of dimensions, during freezing of a volume of 5 L of 5% (m/V) sucrose aqueous solution. The bottle was frozen inside a chamber with a vertical (unidirectional) flow of gas at −75° C., during 360 min. FIG. 2 shows the increasing pressure inside the bottle during the freezing process without the ice-crust attenuator device 10.

Figure 8:
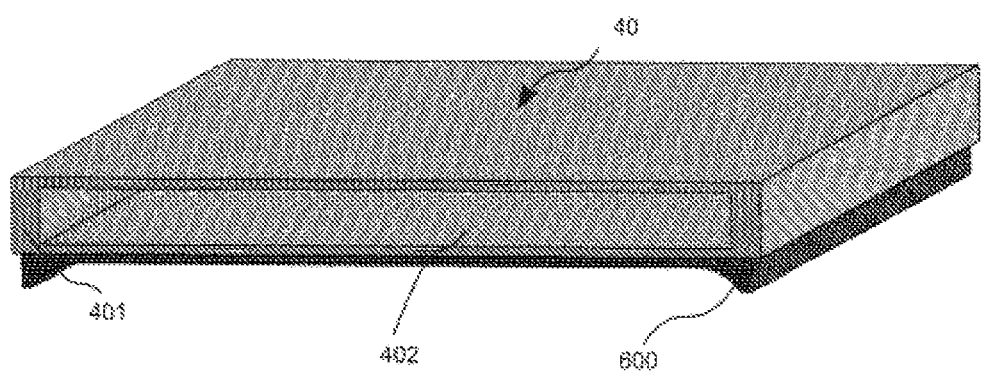
FIG. 8 is an elevated view of another ice-crust attenuator device 40 in accordance with present disclosure.

In an exemplary embodiment depicted in FIG. 8, another ice-crust attenuator device 40 for freezing, transporting, storing and thawing aqueous solutions of biological materials is shown. This ice-crust attenuator device 40 should be used preferentially, when freezing, transporting, storing and thawing aqueous solutions of biological materials in moldable containers 30. Said moldable container 30 configured to contain aqueous solutions of biological materials can take several forms of configuration, such as bags, and comprises at least tubbing 202 at one end for aseptic filling and venting operations. The moldable container 30 can deform when filled with product and can be made of a biocompatible polymeric material to promote compatibility with biological materials. The biocompatible polymeric materials can be, for instance, ethylene-vinyl acetate copolymer, ethylene-vinyl alcohol copolymer, polytetrafluoroethylene, polyethylene, polyesters, polyamides, polypropylenes, polyvinylidene fluoride, polyurethanes, polyvinylchlorides, and copolymers, mixtures or laminates that comprise the above. An advantage of the moldable container 30 relies on the intrinsic characteristic of conforming to the shape of the holder 500. This is important for promoting a good thermal contact and repeatability between the moldable container 30 and the ice-crust attenuator device 40. The moldable container 30 may vary in size and volumetric capacity. In a preferred embodiment, moldable container has a volumetric capacity in a range from approximately 10 mL to approximately 20 L, preferably in a range from approximately 2 L to approximately 20 L and more preferably in a range from approximately 2 L to approximately 10 L.

The ice-crust attenuator device 40, depicted in FIG. 8, has particularly relevance in a common freezing process, when a moldable container (bag) is placed directly in a cavity of a refrigerated chamber. Therefore, by having an ice-crust attenuator device 40 configured to be placed in the cavity and in the top of the container in contact with its upper surface, the upper face of the container is kept under insulated conditions avoiding the formation of a top ice-crust and consequently avoiding the damage of the container, as described previously. The ice-crust attenuator device 40 should have the same technical characteristics of the previously described ice-crust attenuator device 10. The ice-crust attenuator device 40 can be made of an insulating material 401, such as plastic, polymer or other material having low thermal conductivity. Preferentially, the thermal insulating material 401 can be any material with a thermal conductivity less than $0.5\ W\,m^{-1}\,K^{-1}$, such as poly-ethylene, polypropylene, polycarbonate, polylactic acid. In addition, the ice-crust attenuator device 40 has an internal cavity 402 arranged to be filled with a phase change material (PMC) to improve the thermal insulation.

The ice-crust attenuator device 40 may also comprise a moldable material 600, as described previously. Said moldable material 600, may be made, preferentially, of any resilient or soft material with low thermal conductivity, such as extruded polystyrene foam, polyurethane foam, polychloroprene or acrylonitrile butadiene rubber. The moldable material 600 is configured to be pressed against the upper surface of the moldable container 30, promoting a good thermal contact between the ice-crust attenuator device 40 and the outer surface of the moldable container 30, ensuring no air between the two surfaces. Said moldable material 600 can be attached to the ice-crust attenuator device 40 by means of compatible adhesive materials, by mechanical means or by magnetic contact using magnetic materials for that purpose.

Figure 9A:
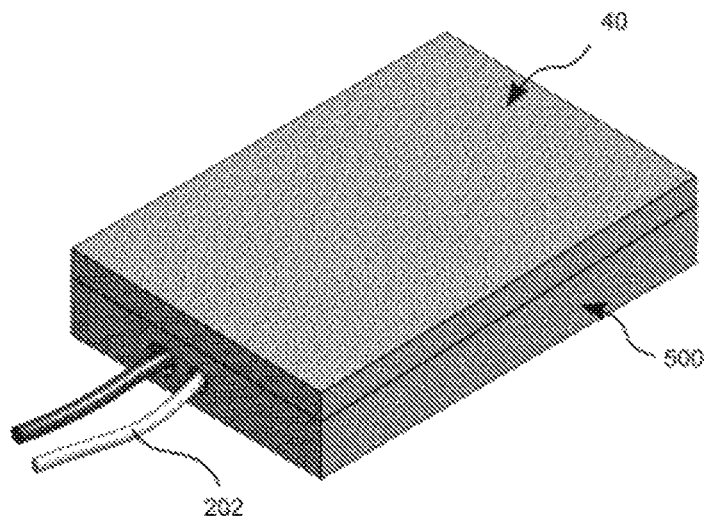
FIG. 9a is an elevated view of another ice-crust attenuator device 40 with a holder 500 in accordance with present disclosure.
Figure 9B:
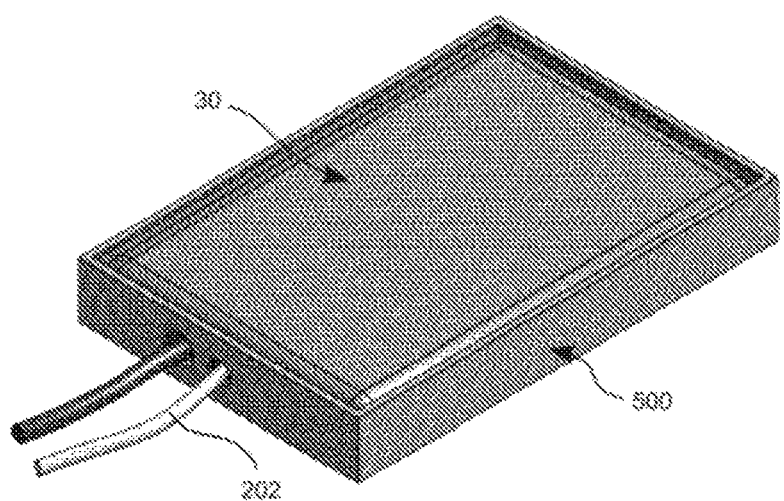
FIG. 9b is an elevated view of a holder 500 to accommodate the moldable container 30 in accordance with present disclosure.

In another embodiment depicted in FIG. 9, the ice-crust attenuator device 40 may be connected to a holder 500 to accommodate the moldable container 30. The advantage of having the holder 500 is to protect the moldable container 30 during freezing, transporting, storing and thawing aqueous solutions of biological materials, avoiding the damage of moldable container 30. Said holder 500 can be made of a plastic, polymer or other material having low thermal conductivity.

In another embodiment, the holder 500 may also comprise one or more surfaces made of a metal, alloy or a high thermal conductivity polymer. Preferentially, is made of a material with a thermal conductivity higher than 0.5 W m$^{-1}$ K$^{-1}$. Preferentially, the holder may comprise only a bottom surface that is made of a metal, alloy or a high thermal conductivity polymer, configured to attain a good thermal contact between the bottom of the holder and the bottom surface of the moldable container 30, maximizing the heat transfer. An advantage of this embodiment is that, by keeping the ice-crust attenuator device 40 in the top of the holder and a heat transfer surface in the bottom, the aqueous solution of biological materials will freeze under unidirectional conditions from the bottom upwards. In the present disclosure unidirectional freezing, specifically unidirectional bottom-up freezing, means the creation of a unidirectional temperature gradient along the vertical axis that causes the ice-front to develop and progress from bottom to up of the container. The unidirectional bottom-up freezing allows the improvement of the freezing process of aqueous solutions of biological materials, preventing cryoconcentration and the damage or rupture of the containers.

Figure 10B:
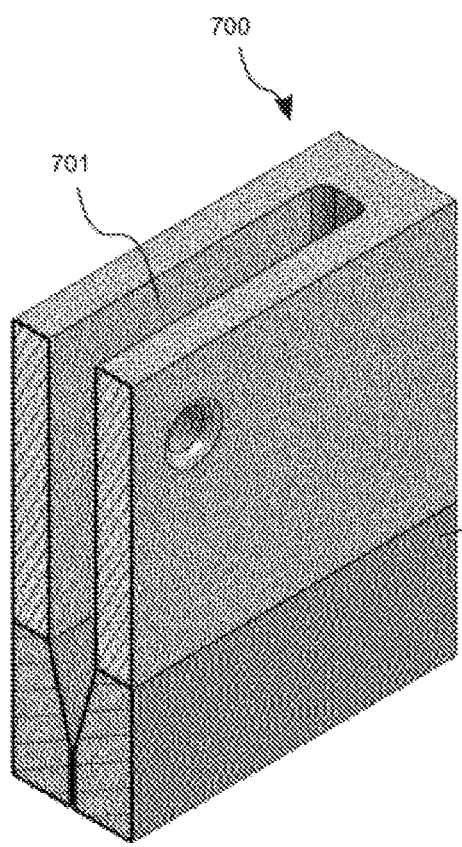
FIG. 10b is cross-section view of another holder 700 with a heat transfer bottom 702 in accordance with present disclosure.
Figure 10A:
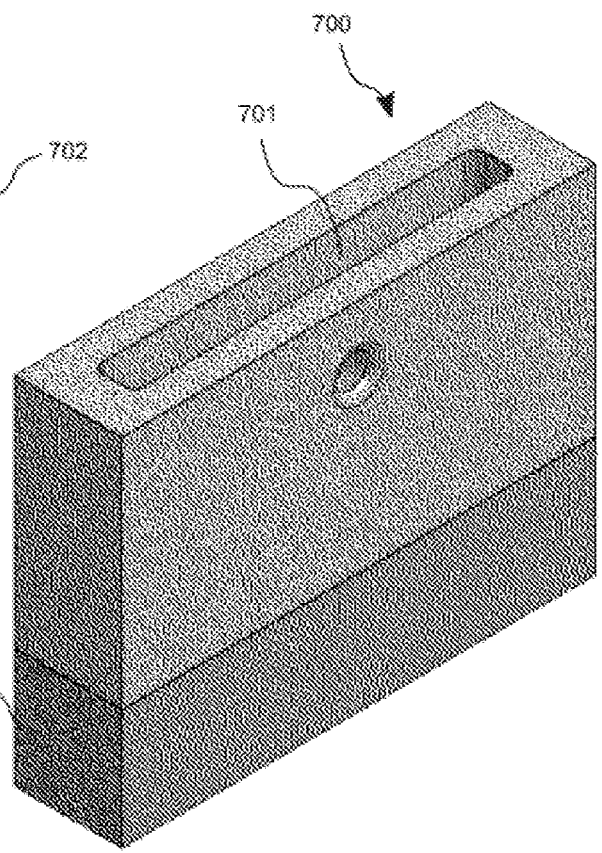
FIG. 10a is an elevated view of another holder 700 with a heat transfer bottom 702 in accordance with present disclosure.

In another embodiment depicted in FIG. 10, it may be useful to freeze, store and thaw an aqueous solution of biological materials in a small-volume moldable container 30 at vertical position. However, freezing small-volumes using moldable containers, such as bags, can lead to the problems above mentioned (formation of the ice-crust and deformation of the container), and problems associated to quality and reproducibility. Therefore, as depicted in FIG. 10, to avoid such problems, it may be useful freezing aqueous solution of biological materials in moldable container 30, using a holder 700 comprising a heat transfer bottom 702 design to accommodate the moldable container 30 in a cavity 701. The holder 700 has the heat transfer bottom 702 to considerably accelerating the heat transfer in the bottom of the moldable container 30, increasing the reproducibility and scalability of freezing and nucleation of the aqueous solution of biological materials. The heat transfer bottom 702 can be made of a metal, alloy or a high thermal conductivity polymer. The heat transfer bottom 702 can hold a contacting fluid to enhance the thermal contact between the heat transfer bottom 702 and the bottom of the moldable container 30, thus enhancing the reproducibility of the controlled nucleation between several containers and also decreasing the nucleation time.

In the embodiment depicted in FIG. 10, the holder 700 will insulate the lateral walls of the moldable container 30 and acts as support to allow the unidirectional bottom-up freezing and to maintain the shape of the moldable container 30 in response to an expansion of biological material held due to freezing. The holder 700 can be made of a plastic, polymer or other material having low thermal conductivity. It is important to promote thermal contact between the moldable container 30 and the holder 700.

In another embodiment, the holder 700 can have multiple cavities 701, each one adjacent to each other, to receive multiple moldable container 30. With this strategy it is possible to increase the number of moldable containers 30 per holder 700 assuring that multiple moldable containers 30 will experience similar time-temperature profiles and thus increase the freezing reproducibility. Besides having multiple cavities 701, all the remaining features are identical to the ones previously described.

In another embodiment, to avoid the ice-crust formation in the top of the moldable container 30, it may be useful to freeze the aqueous solution of biological materials using the holder 700 placed in an isothermal temperature chamber or compartment with an ice-crust attenuator device 40 at the top. The ice-crust attenuator device 40 in the top of the chamber will eliminate the loss of heat at the top interface of the liquid by radiation and do not let the air in the head-space of the container cool during the freezing period.

Other embodiments of present disclosure can be obtained through the assembling of controlled heating, by means of internal flow of a temperature-controlled fluid, by an electrical resistance, or by a thermoelectric element (Peltier) whose temperature is controlled by electric current.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. An ice-crust attenuator device for use when freezing or thawing an aqueous biological solution and for reducing and/or preventing ice-crust formation on the solution, comprising:
   a plurality of separable portions each comprising an external wall and an internal wall, wherein each external wall and each internal wall comprises a thermal insulating material; and
   a phase change material disposed in a cavity between the internal wall and the external wall of each separable portion,
   wherein at least a portion of the internal wall of at least one of the separable portions forms a recess configured for receiving a container,
   wherein a freezing temperature of the phase change material ranges from a temperature close to a freezing point of the aqueous biological solution to 10% above the freezing point of the aqueous biological solution, thereby reducing and/or preventing ice-crust formation on the liquid and air interface,
   wherein the internal wall further comprises a moldable thermal insulating material,
   wherein the moldable thermal insulating material of the internal wall is moldable to form an airtight seal over the container top,
   wherein a total volume of the phase change material is not more than 50% of a volume of the aqueous biological solution,
   wherein the thermal insulating material of the internal wall and the thermal insulating material of the external wall have thermal conductivities of less than 0.5 W m$^{-1}$K$^{-1}$,
   wherein the thermal insulating material of the internal wall is different from the thermal insulating material of the external wall wherein the phase change material further comprises a nucleating agent selected from the group consisting of: silver iodide, lead iodide, and combinations thereof, and
   wherein the plurality of separable portions comprise respective locking mechanisms adapted to join the plurality of separable portions to surround the container top.

2. The ice-crust attenuator device according to claim 1, wherein the internal and external walls are continuous, thus forming a single unit.

3. The ice-crust attenuator device according to claim 1, wherein the phase change material is a pure liquid or liquid mixture having a freezing temperature between −5° C. and 5° C.

4. The ice-crust attenuator device according to claim 1, wherein the thermal insulating materials of the internal and external walls are selected from the group consisting of: plastic, polymer, polyethylene, polypropylene, polycarbonate, polylactic acid, and combinations thereof.

5. The ice-crust attenuator device according to claim 1, wherein a volume of phase change material in the internal cavity is not more than 20% of a volume of the aqueous biological solution.

6. The ice-crust attenuator device according to claim 1, wherein the phase change material is selected from the group consisting of: water, a mixture of water and ethylene glycol, a mixture of water and sodium chloride, a mixture of water and ethanol, and combinations thereof.

7. The ice-crust attenuator device according to claim 1, wherein the moldable thermal insulating material is selected from the group consisting of: extruded polystyrene foam, polyurethane foam, polychloroprene or acrylonitrile butadiene rubber, and combinations thereof.

8. The ice-crust attenuator device according to claim 1, wherein the device is configured to cover the top of the container and 20% of a height of the aqueous biological solution in the container.

9. The ice-crust attenuator device according to claim 1, wherein the device is configured to cover the top of one of a bottle, a vial, a tube, and a bag.

10. The ice-crust attenuator device according to claim 1, wherein the moldable container is a small-volume flexible container, wherein the holder has a heat transfer bottom, and wherein the holder has a vertical cavity to receive the aqueous biological solution in the small-volume flexible container.

* * * * *

UNITED STATES PATENT AND TRADEMARK OFFICE
CERTIFICATE OF CORRECTION

PATENT NO. : 12,336,532 B2
APPLICATION NO. : 17/292921
DATED : June 24, 2025
INVENTOR(S) : Rui De Brito Estrela, Andreia Filipa Silvestre Duarte and Pedro Gil Sena Rego Page 1 of 1

It is certified that error appears in the above-identified patent and that said Letters Patent is hereby corrected as shown below:

In the Claims

Column 10, Lines 19-20, insert --surface-- after "solution" and before the ","

Signed and Sealed this
Twelfth Day of August, 2025

Coke Morgan Stewart
*Acting Director of the United States Patent and Trademark Office*